United States Patent [19]

von der Brake

[11] Patent Number: 4,501,989
[45] Date of Patent: Feb. 26, 1985

[54] RADIATION DETECTING ARRANGEMENT FOR COUNTING AN IONIZING RADIATION

[75] Inventor: Dieter von der Brake, Altena, Fed. Rep. of Germany

[73] Assignee: International Standard Electric Coporation, New York, N.Y.

[21] Appl. No.: 445,628

[22] Filed: Nov. 30, 1982

[30] Foreign Application Priority Data

Dec. 11, 1981 [DE] Fed. Rep. of Germany ....... 3149148

[51] Int. Cl.³ .......................... H01J 47/08; H01J 5/16; G01T 1/18
[52] U.S. Cl. ...................................... 313/93; 313/112; 250/374
[58] Field of Search .................. 313/93, 112; 378/156, 378/157, 158, 159; 250/374; 82/11, 13; 51/290; 156/294

[56] References Cited

U.S. PATENT DOCUMENTS 2,630,732  3/1953  Piazze ...................................... 82/13
3,826,521  7/1974  Wilhelmsen .......................... 156/294

FOREIGN PATENT DOCUMENTS 52-17877  2/1977  Japan ................................... 250/374
1569883   6/1980  United Kingdom ................ 378/156
2097640   11/1982 United Kingdom ................ 378/156

Primary Examiner—David K. Moore
Assistant Examiner—John Baron, Jr.
Attorney, Agent, or Firm—John T. O'Halloran; Peter R. Ruzek

[57] ABSTRACT

A radiation detecting arrangement for measuring or counting an ionizing radiation contains a compensating filter arrangement which safequards a measurement of the radiation dose which is either independent of the energy, or independent of both the energy and the direction thereof. The compensating filter arrangement contains a supporting tube made from a slightly absorbing metal having an ordinal number not higher than about 35, which surrounds a tubular radiation detector and which, on its surface, carries several ring-shaped filter parts. These filter parts are made from one or more metal sleeves of a heavy metal or of a heavy metal alloy slipped onto the supporting tube and soldered or cemented thereto. These filter parts, as regards position and shape, are manufactured by a metal-removing process with only the supporting tube being clamped by the metal-removing machine. In this way it is possible for the relatively soft-metallic filter parts to be worked on by a metal-removing machine without them having to be subjected to the chucking forces in the metal-cutting machine.

8 Claims, 2 Drawing Figures ern RADIATION DETECTING ARRANGEMENT FOR COUNTING AN IONIZING RADIATION

BACKGROUND OF THE INVENTION

The present invention relates to a radiation detecting arrangement for counting an ionizing radiation by means of a radiation detector of tubular form comprising a compensating filter arrangement.

Radiation detectors for counting or measuring an ionizing radiation, under the effect of this radiation, produce electric signals whose magnitude is a measure of the dose rate of the ionizing radiation acting upon the radiation detector. In order to be able to make the magnitude of these electric signals independent of the energy or of the energy and the direction of the ionizing radiation acting upon the radiation detector, a compensating filter or a compensating filter arrangement is arranged around the radiation detector, in particular around the active volume thereof. The compensating filter arrangement is so constructed that it, in the energy spectrum of the radiation, will strongly absorb such radiation components which, at the same dose rate, will trigger a greater electric signal in the radiation detector. In addition, ionizing radiations from directions from which they, at the same dose rate, would trigger a signal of smaller magnitude in the radiation detector, are less absorbed.

A radiation detecting arrangement of the type mentioned hereinbefore, is known, for example, from German Patent DE-OS No. 2,814,091. This prior art radiation detecting arrangement comprises a merely slightly absorbing supporting tube surrounding a radiation detector of tubular construction on the outside of which a number of different annular and sleeve-shaped filter parts are arranged. For establishing the desired absorption curve of the prior art radiation detecting arrangement, fixed spacings are provided for between the individual differently constructed filter parts. For fixing these spacings, for example, spacing rings are provided for in the prior art radiation detecting arrangement.

It has proved, however, that the manufacture of prefabricated ring-shaped filter parts having the shape required for manufacturing a radiation detecting arrangement of the type mentioned hereinabove, is extremely uneconomical in many cases, because the filter parts can only be injection-molded or cast. The filter parts are mostly made from a material which flows when being subjected to pressure. Therefore, they are unsuitable for being chucked or clamped for permitting a stock-removing machining.

SUMMARY OF THE INVENTION

It is the object of the present invention, therefore, to provide a radiation detecting arrangement of the type mentioned hereinabove such that no prefabricated ring-shaped or annular filter parts have to be used, but that the filter parts, without having to be chucked or clamped in a holding device, can be brought into the intended shape by way of a stock-removing machining.

A feature of the present invention is the provision of a radiation detecting arrangement for measuring an ionizing radiation comprising a radiation detector having a tubular shape; and a compensating filter arrangement including a slightly absorbing supporting tube surrounding the detector, and ring-shaped filter parts fastened to and surrounding an outer surface of the tube, the tube being made from a metal having a low medium ordinal number of the periodic system of elements and having an adhesive layer on the outer surface thereof, and the filter parts are individual parts of at least one selected one of a heavy metal sleeve and a heavy metal alloy sleeve, the selected one of the sleeves being fastened by the layer to the tube and the filter parts being formed from the selected one of the sleeves by removal of excessive sleeve material therefrom after the selected one of the sleeves is fastened to the tube by the layer.

The present invention offers the advantage that, for the purpose of the stock-removing machining or tooling of the filter parts, not these parts as such, but the supporting tube of the metal sleeve soldered thereon, is clamped into a holding device. By the soldering there is established such a positive connection of the metal sleeve of the filter to the supporting tube, that a stock-removing machining of the metal sleeve of the filter becomes possible for forming the individual filter parts.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
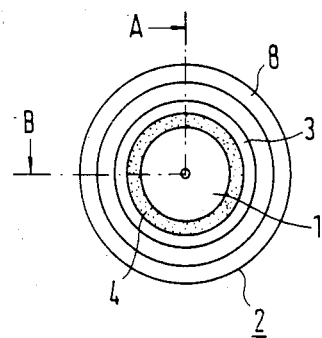
FIG. 1 is a view in direction of the cylindrical axis at the left-hand end of the radiation detecting arrangement in accordance with the principles of the present invention.
Figure 2:
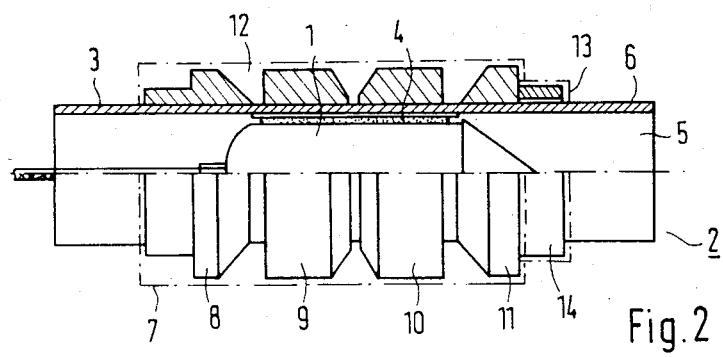
FIG. 2 is a cross sectional view of the radiation detecting arrangement of FIG. 1 taken along lines A—B of FIG. 1.

The radiation detecting arrangement as shown in FIGS. 1 and 2 comprises a tubular radiation detector 1, such as a Geiger-Mueller counter tube, and a compensating filter arrangement 2. This compensating filter arrangement 2 comprises a relatively thin-walled supporting tube 3 which is made from a metal will only slightly absorb an ionizing radiation, or else from a metal alloy having an ordinal number within the periodic system of the elements in the utmost of about 35 and which, in the illustrated embodiment, is a brass tube. Inside supporting tube 3 there is supported radiation detector 1 whose cylindrical outer jacket is supported in a shock-proof manner against the inside wall 5 of supporting tube 3 by means of a strip of microcellular rubber 4. The outside of supporting tube 3 is provided with a thin layer of soldering tin 6 onto which, in manufacturing the compensating filter arrangement 2, a metal sleeve 7 (indicated by the dot-and-dash line in the drawing) is slipped and, in the course of a soldering process, is connected in a positive manner to the material of the oppositely lying surface of supporting tube 3 by layer 6. In the illustrated embodiment, metal sleeve 7 is made of a lead-tin alloy. For manufacturing the individual filter parts 8, 9, 10 and 11, supporting tube 3 is clamped or chucked in a metal working machine. In this metal working machine, metal sleeve 7 carried by supporting tube 3 is subjected to a metal removing process which is performed in accordance with a given program and which, in accordance with this program, forms the individual filter parts 8, 9, 10 and 11 to have the prescribed shape. This metal working machine, for example, is an automatic lathe which, in the course of a chip removing process, removes the excessive material 12 of metal sleeve 7.

Following this process, a second metal sleeve 13 of another heavy metal, such as lead, is slipped onto supporting tube 3 and is cemented thereto with the aid of an adhesive. From metal sleeve 13, in the course of a second metal-removing process corresponding to the one described hereinabove, a filter part 14 is produced on supporting tube 3.

The metal or the metal alloy of metal sleeves 7 and 13 are mechanically so soft that they, under the clamping pressure of the chucking device of a metal working machine become subject to a flow deformation and are thus unsuitable for such a manufacture of their shape. Only in connection with the clampable or chuckable supporting tube 3 is it possible to give the individual filter parts the predetermined shape required for operation by way of metal-stock removal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radiation detecting arrangement for measuring an ionizing radiation comprising:
   a radiation detector having a tubular shape; and
   a compensating filter arrangement including
      a slightly absorbing supporting tube surrounding said detector, and
      ring-shaped filter parts fastened to and surrounding an outer surface of said tube,
      said tube being made from a metal having a low medium ordinal number of the periodic system of elements and having an adhesive layer on said outer surface thereof, and
      said filter parts are individual parts of at least one selected one of a heavy metal sleeve and a heavy-metal alloy sleeve, said related one of said sleeves being fastened by said layer to said tube and said filter parts being formed from said selected one of said sleeves by removal of excessive sleeve material therefrom after said selected one of said sleeves is fastened to said tube by said layer.

2. A detecting arrangement according to claim 1, wherein
   said tube is a brass tube.

3. A detecting arrangement according to claim 2, wherein
   said heavy metal alloy sleeve is a lead-tin alloy sleeve.

4. A detecting arrangement according to claim 3, wherein
   said filter parts are individual parts of a plurality of said selected one of said sleeves each having a different reflected one of said heavy metal and said heavy metal alloys fastened to said layer of said tube.

5. A detecting arrangement according to claim 2, wherein
   said filter parts are individual parts of a plurality of said selected one of said sleeves each having a different reflected one of said heavy metal and said heavy metal alloys fastened to said layer of said tube.

6. A detecting arrangement according to claim 1, wherein
   said heavy metal alloy sleeve is a lead-tin alloy sleeve.

7. A detecting arrangement according to claim 6, wherein
   said filter parts are individual parts of a plurality of said selected one of said sleeves each having a different reflected one of said heavy metal and said heavy metal alloys fastened to said layer of said tube.

8. A detecting arrangement according to claim 1, wherein
   said filter parts are individual parts of a plurality of said selected one of said sleeves each having a different reflected one of said heavy metal and said heavy metal alloys fastened to said layer of said tube.

* * * * *